US008238296B2

(12) United States Patent
Sim et al.

(10) Patent No.: US 8,238,296 B2
(45) Date of Patent: Aug. 7, 2012

(54) METHOD AND APPARATUS FOR SCANNING FOR AN IDLE CHANNEL IN A FREQUENCY ENVIRONMENT

(75) Inventors: Dae-yong Sim, Suwon-si (KR); Ho-seok Lee, Anyang-si (KR); Si-hyung Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1021 days.

(21) Appl. No.: 12/121,905

(22) Filed: May 16, 2008

(65) Prior Publication Data

US 2008/0285515 A1    Nov. 20, 2008

(30) Foreign Application Priority Data

May 16, 2007    (KR) .................... 10-2007-0047845

(51) Int. Cl.
*H04W 4/00*    (2009.01)
(52) U.S. Cl. ......... 370/329; 370/341; 455/450; 455/509
(58) Field of Classification Search ................ None
See application file for complete search history.

(56) References Cited

U.S. PATENT DOCUMENTS

| | | | | |
|---|---|---|---|---|
| 5,534,914 A * | 7/1996 | Flohr et al. | ................... | 348/14.1 |
| 2003/0035388 A1 * | 2/2003 | Schmidt | ........................ | 370/329 |
| 2005/0053033 A1 * | 3/2005 | Kelly et al. | .................... | 370/329 |
| 2006/0133648 A1 * | 6/2006 | Meunier et al. | ............... | 382/103 |
| 2006/0176861 A1 * | 8/2006 | Schmidt | ........................ | 370/337 |

OTHER PUBLICATIONS

Jain, Raj. "IEEE 802.22 Wireless Regional Area Networks." Washington University in St. Louis, pp. 1-14, 2008.
Communication dated Mar. 19, 2012 issued by the State Intellectual Property Office of P.R. China in counterpart Chinese Application No. 200810086762.2.

* cited by examiner

*Primary Examiner* — Chi H. Pham
*Assistant Examiner* — Shick Hom
(74) *Attorney, Agent, or Firm* — Sughrue Mion, PLLC

(57) ABSTRACT

An idle channel scanning method and apparatus are provided. The method of scanning for an idle channel via a device communicating with a plurality of peripheral devices in the same frequency environment includes: allocating at least one of all frequency channels of the frequency environment to each peripheral device of the plurality of peripheral devices; requesting the plurality of peripheral devices a state of the frequency channels allocated to each peripheral device; and receiving information on the frequency channel state scanned by the plurality of peripheral devices in response to the request for the state of the frequency channels allocated.

31 Claims, 3 Drawing Sheets

METHOD AND APPARATUS FOR SCANNING FOR AN IDLE CHANNEL IN A FREQUENCY ENVIRONMENT

CROSS-REFERENCE TO RELATED PATENT APPLICATION

This application claims priority from Korean Patent Application No. 10-2007-0047845, filed on May 16, 2007, in the Korean Intellectual Property Office, the disclosure of which is incorporated herein in its entirety by reference.

BACKGROUND OF THE INVENTION

1. Field of the Invention

Methods and apparatuses consistent with the present invention relate to scanning for an idle channel, and more particularly, to scanning for an idle channel in the same frequency environment.

2. Description of the Related Art

A technology related to a cognitive radio technology for sensing a current state of a channel according to region and time, intelligently determining the current state, selecting an appropriate frequency, modulation, and output power, and dynamically moving to an idle channel to perform radio communication in real time, has been actively developed so as to use limited frequency resources.

In order to use such technology in an ultra high frequency (UHF) band, it is important that the technology is capable of rapidly detecting a primary user device (i.e., a device which has priority to use a channel), and allows communication between devices other than the primary user device, by using an idle channel that is a channel not used by the primary user device.

FIG. 1 is a diagram illustrating a conventional method of scanning frequencies to obtain a channel state.

In operation 110, a base station transmits a channel state scanning request to a terminal.

Although FIG. 1 shows a single terminal, the base station may transmit a channel state scanning request to a plurality of terminals. Hereinafter, a process will be described as if performed between one of a plurality of terminals and the base station.

In operation 120, the terminal transmits a request received response to the base station, indicating that the terminal has received the channel state scanning request. If the base station does not receive the request received response, the base station again transmits the channel state scanning request to the terminal. If the base station received the response, the base station waits for a report of the channel state from the terminal.

In operation 130, the terminal reports the channel state scanned according to the channel state scanning request, to the base station.

In operation 140, the base station transmits a report received response to the terminal, indicating that the base station has received the channel state report from the terminal. If the terminal does not receive the report received response, the terminal again reports the channel state to the base station.

The base station receives a channel state report from the plurality of terminals according to the above process. Each channel state report includes information regarding the communication quality of the channel, and whether the channel is in use.

At this time, each terminal scans the state of all frequency channels within its surrounding environment (i.e., its frequency environment) and reports each channel state to the base station. Conventionally, since the plurality of terminals are far away from each other (e.g., 30~100 km), the frequency environment of each terminal differs from that of another terminal, so that the base station receives different information regarding the channel state from each terminal.

However, when the frequency band is a UHF band, each terminal can have the same frequency environment due to the characteristics of a UHF radio wave in a small area, for example, indoors. As such, the conventional method has a problem in that each of a plurality of terminals scans the state of all frequency channels in the same frequency environment, and thus the conventional method cannot efficiently scan the frequency environment to obtain the state of all the frequency channels.

SUMMARY OF THE INVENTION

Exemplary embodiments of the present invention provide an idle channel scanning method and apparatus by using a device communicating with a plurality of peripheral devices in the same frequency environment prepared for efficiently scanning for the idle channel.

According to an aspect of the present invention, there is provided a method of scanning for an idle channel via a device communicating with a plurality of peripheral devices in the same frequency environment, the method comprising: allocating at least one of all frequency channels of the frequency environment to each peripheral device of the plurality of peripheral devices; requesting the plurality of peripheral devices a state of the frequency channels allocated to each peripheral device; and receiving information on the frequency channel state scanned by the plurality of peripheral devices in response to the request for the state of the frequency channels allocated.

The allocating of at least one of all frequency channels may comprise: allocating at least one of a number and band of the frequency channels to each peripheral device.

The number of the frequency channels may be allocated to each peripheral device based on the number peripheral devices in the plurality of peripheral devices.

The number of the frequency channels may be allocated to each peripheral device based on performance characteristics of each peripheral device.

A greater number of frequency channels may be allocated to a peripheral device of the plurality of peripheral devices having relatively better performance characteristics than the other peripheral devices of the plurality of peripheral devices, so that the peripheral device having relatively better performance can scan states of a greater number of frequency channels.

The number of frequency channels may be allocated to each peripheral device based on information on the performance of each peripheral device obtained from a database storing information on types and/or performance of the plurality of peripheral devices.

The number of frequency channels may be allocated to each peripheral device based on a current operation performed by each peripheral device.

A smaller number of frequency channels may be allocated to one of the plurality of peripheral devices that performs a relatively more important current operation than the other peripheral devices so that the peripheral device that performs the relatively more important operation can scan states of a smaller number of frequency channels.

A greater number of frequency channels may be allocated to one of the plurality of peripheral devices that performs an operation having relatively fewer loads than the other peripheral devices so that the peripheral device that performs the operation having relatively fewer loads can scan states of a greater number of frequency channels.

The current operation performed by each peripheral device may include one of operations of outputting a predetermined piece of data, transmitting another predetermined piece of data, and performing a predetermined operation.

At least one of the number and band of the frequency channels may be allocated to each peripheral device at regular predetermined periods by changing at least one of the number and band of the frequency channels previously allocated.

At least one of the number and band of the frequency channels may be allocated to each peripheral device by determining a start channel and an end channel of the frequency channels that are to be scanned by each peripheral device.

The information on the frequency channel state scanned may include at least information on communication quality of the frequency channels allocated and information on whether the frequency channels allocated are in use.

According to another aspect of the present invention, there is provided a method of scanning for an idle channel via a base station communicating with a plurality of terminals in the same frequency environment, the method comprising: allocating at least one of all frequency channels to each of the plurality of terminals; transmitting a channel state scanning request for scanning a state of frequency channels allocated to each terminal to the plurality of terminals; and receiving information on the frequency channel state scanned by the plurality of terminals in response to the channel state scanning request.

According to another aspect of the present invention, there is provided an apparatus scanning an for idle channel via a device communicating with a plurality of peripheral devices in the same frequency environment, the apparatus comprising: a scan channel allocation unit for allocating at least one of all frequency channels of the frequency environment to each peripheral device of the plurality of peripheral devices; a request transmission unit for requesting the plurality of peripheral devices a state of the frequency channels allocated to each peripheral device to the plurality of peripheral devices; and a reception unit for receiving information on the frequency channel state scanned by the plurality of peripheral devices in response to the request for the state of the frequency channels allocated.

According to another aspect of the present invention, there is provided an apparatus for scanning for an idle channel via a base station communicating with a plurality of terminals in the same frequency environment, the apparatus comprising: a scan channel allocation unit for allocating at least one of all frequency channels of the frequency environment to each of the plurality of terminals; a request transmission unit for requesting the plurality of peripheral devices a state of the frequency channels allocated to each terminal to the plurality of terminals; and a reception unit for receiving information on the frequency channel state scanned by the plurality of terminals in response to the request for the state of the frequency channels allocated.

BRIEF DESCRIPTION OF THE DRAWINGS

The above and other exemplary aspects of the present invention will become more apparent by the following detailed description of exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown.

Figure 1:
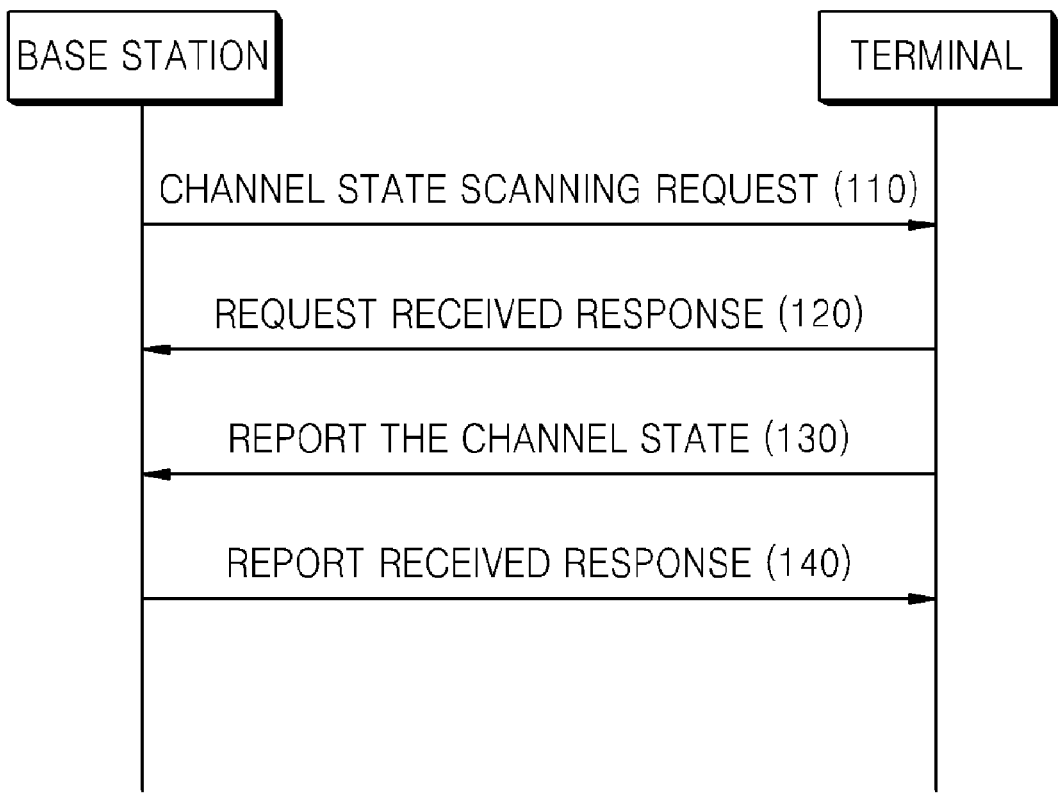
FIG. 1 is a diagram illustrating a conventional method of scanning for a channel state.
Figure 2:
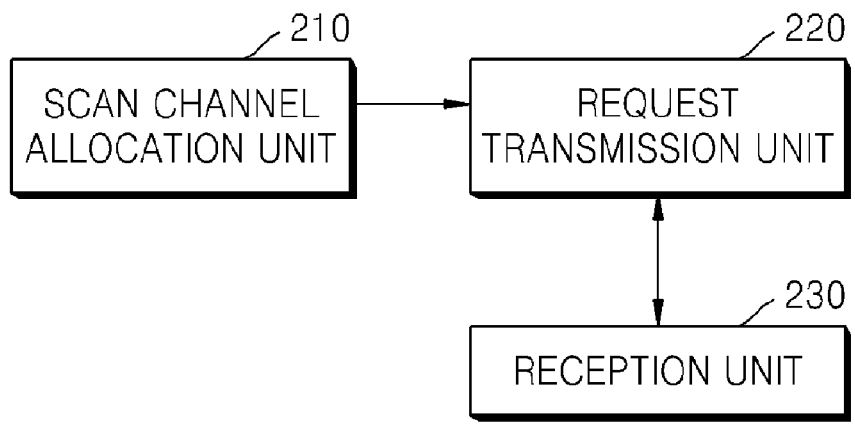
FIG. 2 is a block diagram of an idle channel scanning apparatus in the same frequency environment according to an exemplary embodiment of the present invention.

FIG. 2 is a block diagram of an idle channel scanning apparatus in the same frequency environment according to an exemplary embodiment of the present invention. Referring to FIG. 2, the idle channel scanning apparatus comprises a scan channel allocation unit 210, a request transmission unit 220, and a reception unit 230.

The scan channel allocation unit 210 allocates at least one of all frequency channels that are to be scanned to each of a plurality of peripheral devices. The scan channel allocation unit 210 can allocate at least one of the number and band of the at least one of all frequency channels that are to be scanned to each of the plurality of peripheral devices.

The present exemplary embodiment allocates the at least one of the number and band of frequency channels that are to be scanned by the plurality of peripheral devices to each of the plurality of peripheral devices, so that each of the plurality of peripheral devices does not scan a state of all frequency channels but scans a state of frequency channels included in the at least one of the number and band of frequency channels that are allocated thereto.

For example, if the number of all frequency channels is 30, all peripheral devices conventionally scan a state of thirty frequency channels, whereas, in an exemplary embodiment of the present invention, a first peripheral device may scan a state of ten frequency channels of a first band between a first frequency channel through a tenth frequency channel, a second peripheral device may scan a state of ten frequency channels of a second band between an eleventh frequency channel through a twentieth frequency channel, and a third peripheral device may scan a state of ten frequency channels of a third band between a twenty-first frequency channel through a thirtieth frequency channel.

In this example, since three peripheral devices divide thirty frequency channels into three bands and each peripheral device scans a state of ten frequency channels, three peripheral devices can scan all the frequency channels three times faster than conventional peripheral devices, and each device can scan a state of a relatively smaller number of frequency channels than conventional peripheral devices during the same period of time, thereby scanning a state of thirty frequency channels faster than conventional peripheral devices.

The request transmission unit 220 transmits a channel state scanning request for scanning the frequency channel state to the plurality of peripheral devices, based on at least one of the number and band of frequency channels allocated by the scan channel allocation unit 210.

The plurality of peripheral devices and the idle channel scanning apparatus may be wirelessly connected to each other, and are assumed to be located in the same frequency environment.

In another exemplary embodiment of the present invention, the plurality of peripheral devices and the idle scanning apparatus may be wirelessly connected to each other, and are assumed to be located within a small region.

The reception unit 230 receives information on the state of frequency channels that are scanned by the plurality of peripheral devices in response to the channel state scanning request transmitted from the request transmission unit 220.

The information on the state of frequency channels includes at least one piece of information on communication quality of the plurality of frequency channels and whether a frequency channel is in use.

In particular, it is possible to scan for an idle channel based on information on whether a predetermined frequency channel is in use by the primary user.

The reception unit 230 can receive a request received response from the plurality of peripheral devices indicating that the plurality of peripheral devices have received the channel state scanning request after the request transmission unit 220 transmits the channel state scanning request to the plurality of peripheral devices. If the reception unit 230 does not receive the request received response from the plurality of peripheral devices, the request transmission unit 220 repeatedly transmits the channel state scanning request to the plurality of peripheral devices until the reception unit 230 receives the request received response from all of the plurality of peripheral devices.

The request transmission unit 220 determines whether the reception unit 230 has received the request received response from the plurality of peripheral devices within a predetermined period of time. If the reception unit 230 does not receive the request received response within the predetermined period of time, the reception unit 230 requests the request transmission unit 220 to re-transmit the channel state scanning request to the plurality of peripheral devices and then the request transmission unit 220 re-transmits the channel state scanning request to the plurality of peripheral devices.

Figure 3:
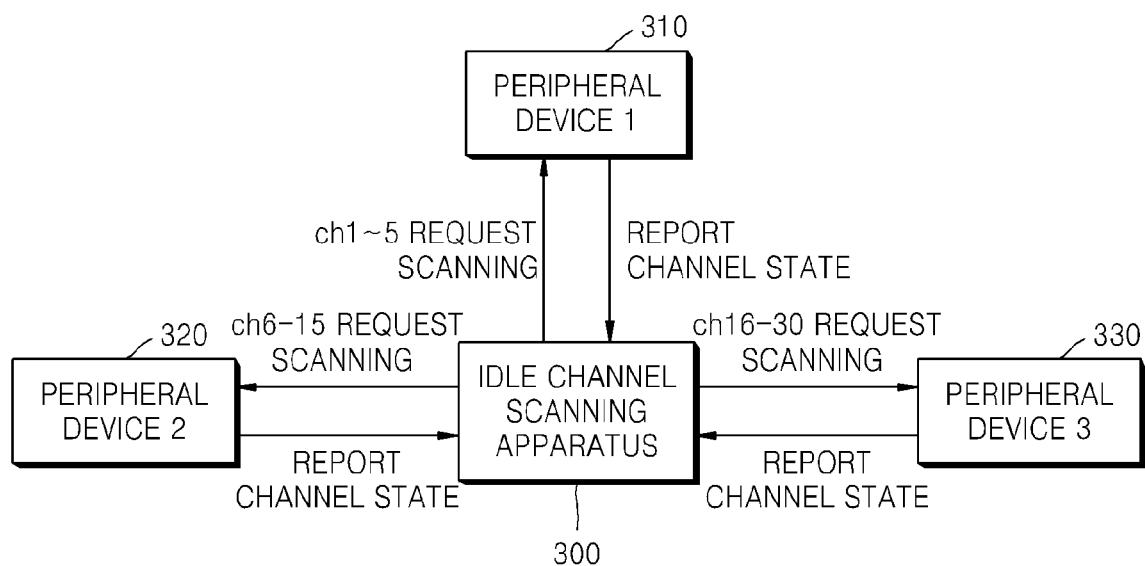
FIG. 3 is a block diagram of the operation of an idle channel scanning apparatus in the same frequency environment according to an exemplary embodiment of the present invention.

FIG. 3 is a block diagram of the operation of an idle channel scanning apparatus 300 in the same frequency environment according to an exemplary embodiment of the present invention. Referring to FIG. 3, the idle channel scanning apparatus 300 receives a channel state report from first through third peripheral devices 310, 320, and 330. The idle channel scanning apparatus 300 and the first through third peripheral devices 310, 320, and 330 may be wirelessly connected to each other.

The same number of frequency channels can be allocated to each of the first through third peripheral devices 310, 320, and 330. For example, if there are thirty frequency channels and three peripheral devices, each peripheral device may scan a state of ten frequency channels and report the frequency channel state to the idle channel scanning apparatus 300.

In this case, each peripheral device can scan the frequency channel state by substitution a frequency channel band allocated to another of the peripheral devices with the same number of frequency channels allocated to the plurality of peripheral devices.

For example, if an original frequency channel band of each of the first through third peripheral devices 310, 320, and 330 includes a first frequency channel through a tenth frequency channel, an eleventh frequency channel through a twentieth frequency channel, and a twenty-first frequency channel through a thirtieth frequency channel, respectively, after a predetermined period of time has passed, the scan channel allocation unit 210 can change the original frequency channel band of each of the first through third peripheral devices 310, 320, and 330 to include the eleventh frequency channel through the twentieth frequency channel, the twenty-first frequency channel through the thirtieth frequency channel, and the first frequency channel through the tenth frequency channel, respectively.

As shown in FIG. 3, the number of frequency channels can be allocated to each of the first through third peripheral devices 310, 320, and 330 based on the performance of each of the first through third peripheral devices 310, 320, and 330.

In more detail, a greater number of frequency channels can be allocated to a peripheral device having relatively better performance than the other peripheral devices so that the peripheral device having relatively better performance can scan a state of a greater number of frequency channels.

For example, referring to FIG. 3, the third peripheral device 330, the second peripheral device 320, and the first peripheral device 310 may have sequentially better performance characteristics, so that the third peripheral device 330, the second peripheral device 320, and the first peripheral device 310 scan a frequency channel state of fifteen frequency channels including a sixteenth frequency channel through the thirtieth frequency channel, ten frequency channels including a sixth frequency channel through a fifteenth frequency channel, and five frequency channels including the first frequency channel through a fifth frequency channel, respectively.

At this time, the scan channel allocation unit 210 can obtain information on the performance of each of the first through third peripheral devices 310, 320, and 330 from a database storing at least one piece of information on types and performance of the first through third peripheral devices 310, 320, and 330, and allocate the number of frequency channels to each of the first through third peripheral devices 310, 320, and 330 based on the performance information.

The information on the performance of each of the first through third peripheral devices 310, 320, and 330 can be received by the reception unit 230 from each of the first through third peripheral devices 310, 320, and 330 in response to an information transmission request transmitted from the request transmission unit 220 requesting the information on the performance of each of the first through third peripheral devices 310, 320, and 330.

According to another exemplary embodiment of the present invention, the number of frequency channels can be allocated to each peripheral device based on the current operation of each peripheral device.

In more detail, a smaller number of frequency channels can be allocated to a peripheral device that performs a relatively more important current operation than other peripheral devices.

Alternatively, a greater number of frequency channels can be allocated to a peripheral device that performs an operation having relatively fewer loads than other peripheral devices.

In this regard, the operation of each peripheral device can include one of operations of outputting a predetermined piece of data, transmitting another predetermined piece of data, and calculating a predetermined operation.

The idle channel scanning apparatus 300 of the present invention can be realized as a base station, and the three peripheral devices 310, 320, and 330 can be realized as terminals. Even in this case, the base station and three terminals must be located near each other, to the extent that they remain in the same frequency environment.

Figure 4:
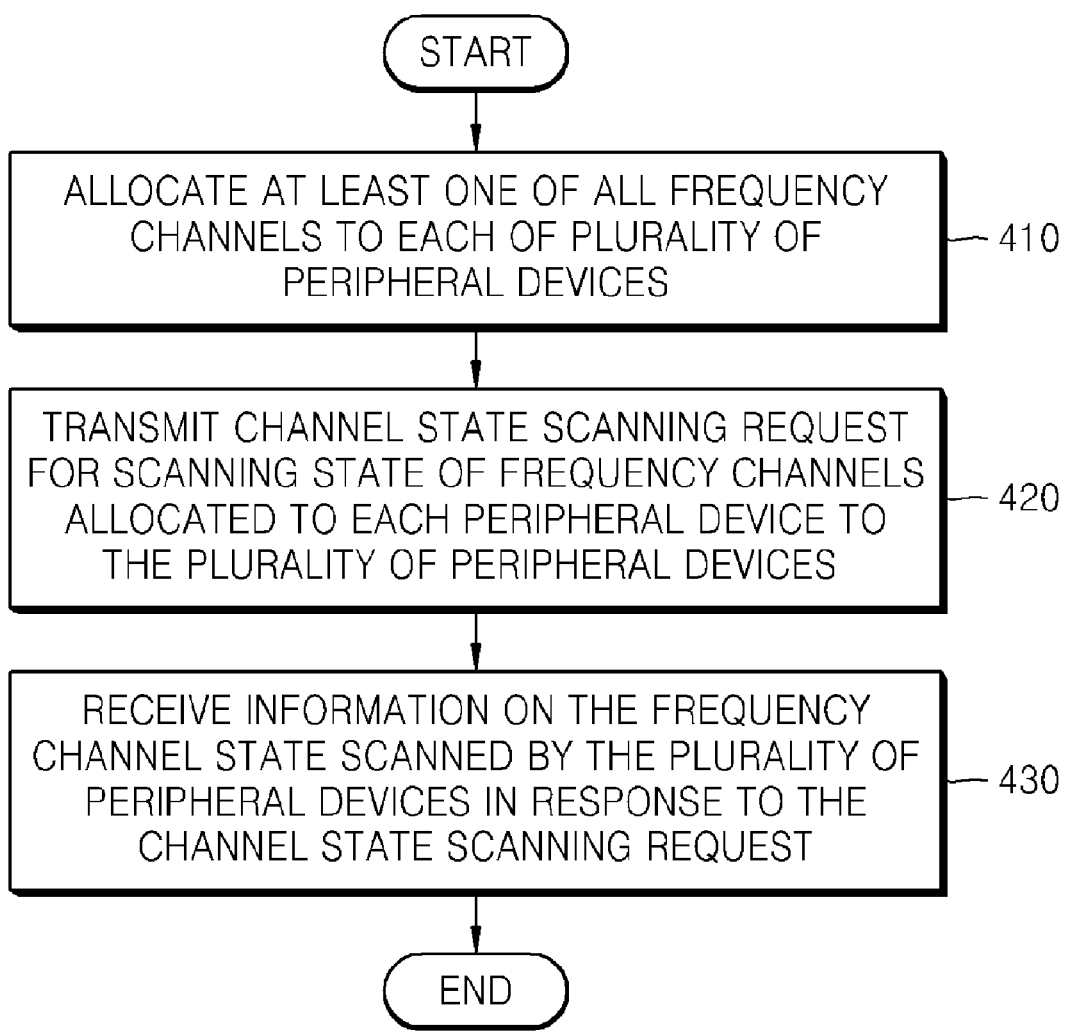
FIG. 4 is a block diagram of an idle channel scanning method in the same frequency environment according to an exemplary embodiment of the present invention.

FIG. 4 is a block diagram of an idle channel scanning method in the same frequency environment according to an exemplary embodiment of the present invention. Referring to FIG. 4, at least one of all frequency channels is allocated to each of a plurality of peripheral devices (Operation 410).

A channel state scanning request for scanning a state of frequency channels allocated to the plurality of peripheral devices is transmitted to each peripheral device (Operation 420).

Information on the frequency channel state scanned by the plurality of peripheral devices is received in response to the channel state scanning request (Operation 430).

The exemplary embodiments of the present invention can be written as computer programs recorded in a computer readable recording medium and/or other transmission media. The exemplary embodiments can be implemented in a computer system that reads the programs from the computer readable recording medium and executes the programs. The computer system comprises a processor, for executing the programs, and a memory, controlled by the processor during execution of the programs. Examples of the computer readable recording medium include magnetic storage media (e.g., ROM, floppy disks, hard disks, etc.), and optical recording media (e.g., CD-ROMs, or DVDs). Other transmission media can include media such as carrier waves (e.g., transmission through the Internet).

The present invention allocates at least one of all frequency channels of a frequency environment to each of a plurality of peripheral devices in the same frequency environment, requests the plurality of peripheral devices a state of the frequency channels allocated to each peripheral device, and receives information on the frequency channel state scanned by each peripheral device in response to the channel state scanning request, thereby efficiently scanning for an idle channel. Furthermore, the present invention can scan a state of frequency channels faster.

While the present invention has been particularly shown and described with reference to exemplary embodiments thereof, it will be understood by those of ordinary skill in the art that various changes in form and details may be made therein without departing from the spirit and scope of the invention as defined by the appended claims. The exemplary embodiments should be considered in a descriptive sense only and not for purposes of limitation. Therefore, the scope of the present invention is defined not by the detailed description of the invention but by the appended claims, and all differences within the scope will be construed as being included in the present invention.

What is claimed is:

1. A method of scanning a frequency environment for an idle channel comprising:
    allocating a first frequency set, including at least a first frequency channel of the frequency channels, to be scanned, in the frequency environment, to a first peripheral device of a plurality of peripheral devices;
    allocating a second frequency set, including at least a second frequency channel of the frequency channels, to be scanned, in the frequency environment, to a second peripheral device of the plurality of peripheral devices;
    requesting the first and the second peripheral devices to scan states of frequency channels of the first and the second frequency sets, respectively; and
    receiving information on the states scanned by the first and the second peripheral devices in response to the requesting,
    wherein the first frequency set does not include a frequency channel included in the second frequency set and the second frequency set does not include a frequency channel included in the first frequency set, and
    wherein frequency channels in the first frequency set and frequency channels in the second frequency set are simultaneously scanned by the first peripheral device and the second peripheral device, respectively.

2. The method of claim 1, wherein the allocating of the first frequency set comprises:
    allocating at least one of a number and a band of the frequency channels of the frequency environment to the first frequency set.

3. The method of claim 2, wherein the number of the frequency channels of the frequency environment is allocated to the first frequency set based on a number of the plurality of peripheral devices.

4. The method of claim 2, wherein the number of the frequency channels of the frequency environment is allocated to the first frequency set based on performance characteristics of the first peripheral device.

5. The method of claim 4, wherein the first peripheral device has better performance characteristics than the second peripheral device, and the allocating allocates the first frequency set so that the number of frequency channels allocated to the first frequency set is greater than a number of frequency channels allocated to the second frequency set.

6. The method of claim 4, wherein the number of frequency channels of the frequency environment allocated to the first frequency set is based on information on the performance of at least one of the plurality of peripheral devices obtained from a database storing information on types and performances of the plurality of peripheral devices.

7. The method of claim 2, wherein the number of the at least one frequency channels of the frequency environment allocated to the first frequency set is based on at least one current operation performed by at least one peripheral device of the plurality of peripheral devices.

8. The method of claim 7, wherein a frequency set including a smaller number of frequency channels is allocated to a peripheral device of the plurality of peripheral devices performing a relatively more important current operation than other peripheral devices.

9. The method of claim 7, wherein a frequency set including a greater number of frequency channels of the frequency environment is allocated to a peripheral device of the plurality of peripheral devices performing an operation having relatively fewer loads than other peripheral devices of the plurality of peripheral devices.

10. The method of claim 7, wherein the at least one current operation performed by at least one peripheral device of the plurality of peripheral devices includes at least one of outputting a predetermined data, transmitting another predetermined data, and performing a predetermined operation.

11. The method of claim 2, wherein the at least one of the number and band of the frequency channels of the frequency environment is allocated to the frequency set at regular predetermined periods by substituting at least one of the number and band of the frequency channels of the frequency environment previously allocated for at least a second of the number and band of the frequency channels of the frequency environment.

12. The method of claim 2, wherein the at least one of the number and band of the frequency channels of the frequency environment is allocated to the frequency set by determining a start channel and an end channel of the frequency channels that are to be scanned by the plurality of peripheral devices.

13. The method of claim 1, wherein the information on the frequency channel state scanned includes at least information on communication quality of the frequency channels included in the frequency sets and information on whether the frequency channels included in the frequency sets are in use.

14. A method of scanning a frequency environment for an idle channel from among frequency channels, the method comprising:

allocating, by a first device, a first frequency set, including at least a first frequency channel of the frequency channels, to be scanned, in the frequency environment to a first terminal of a plurality of terminals;

allocating, by the first device, a second frequency set, including at least a second frequency channel of the frequency channels, to be scanned, in the frequency environment to a second terminal of a plurality of terminals;

requesting, by the first device, the first and the second terminals to scan states of frequency channels of the first and the second frequency sets, respectively; and receiving, by the first device, information on the states scanned by the first and the second terminals in response to the requesting, wherein the first frequency set does not include a frequency channel included in the second frequency set and the second frequency set does not include a frequency channel included in the first frequency set, and wherein frequency channels in the first frequency set and frequency channels in the second frequency set are simultaneously scanned by the first peripheral device and the second peripheral device, respectively.

15. The method of claim 14 wherein the first device is a base station.

16. An apparatus scanning a frequency environment for an idle channel from among frequency channels, the apparatus comprising:

a scan channel allocation unit which allocates a plurality of frequency sets, each frequency set including at least one frequency channel of the frequency channels, to be scanned, in the frequency environment which is different from the frequency channels included in the other frequency sets of the plurality of frequency sets, to a plurality of peripheral devices;

a request transmission unit which requests the plurality of peripheral devices to scan states of frequency channels allocated to the plurality of frequency sets; and a reception unit which receives information on the states scanned by the plurality of peripheral devices in response to the requesting, wherein frequency channels in a first set of the plurality of frequency sets and frequency channels in a second set of the plurality of frequency sets are simultaneously scanned by a first peripheral device of the plurality of peripheral devices, to which the first set is allocated, and a second peripheral device of the plurality of peripheral devices, to which the second set is allocated, respectively.

17. The apparatus of claim 16, wherein the scan channel allocation unit allocates at least one of a number and a band of the frequency channels of the frequency environment to the frequency set which includes the at least one frequency channel.

18. The apparatus of claim 17, wherein the scan channel allocation unit allocates the number of the frequency channels of the frequency environment to the frequency set which includes the at least one frequency channel based on a number of peripheral devices in the plurality of peripheral devices.

19. The apparatus of claim 17, wherein the scan channel allocation unit allocates the number of the frequency channels of the frequency environment to the frequency set which includes the at least one frequency channel based on performance characteristics of the plurality of peripheral devices.

20. The apparatus of claim 19, wherein the scan channel allocation unit allocates a frequency set including a first number of frequency channels of the frequency environment to a peripheral device of the plurality of peripheral devices having relatively better performance characteristics than the other peripheral devices of the plurality of peripheral devices and the first number is greater than numbers of frequency channels allocated to the other peripheral devices.

21. The apparatus of claim 20, wherein the scan channel allocation unit allocates the number of frequency channels of the frequency environment to the frequency set which includes the at least one frequency channel based on information on the performance characteristics of the plurality of peripheral devices obtained from a database storing information on types and performances of the peripheral devices of the plurality of peripheral devices.

22. The apparatus of claim 16, wherein the scan channel allocation unit allocates the number of the at least one frequency channel of the frequency environment to a frequency set based on at least one current operation performed by at least one peripheral device of the plurality of peripheral devices.

23. The apparatus of claim 22, wherein the scan channel allocation unit allocates a frequency set including a smaller number of frequency channels of the frequency environment to a peripheral device of the plurality of peripheral devices that performs a relatively more important current operation than other peripheral devices.

24. The apparatus of claim 22, wherein the scan channel allocation unit allocates a frequency set including a greater number of frequency channels of the frequency environment to a peripheral device of the plurality of peripheral devices that performs an operation having relatively fewer loads than other peripheral devices.

25. The apparatus of claim 22, wherein the at least one current operation performed by at least one peripheral device of the plurality of peripheral devices includes at least one of outputting a predetermined data, transmitting another predetermined data, and performing a predetermined operation.

26. The apparatus of claim 16, wherein the scan channel allocation unit allocates at least one of the number and band of the frequency channels of the frequency environment to the frequency set at regular predetermined periods by substituting at least one of the number and band of the frequency channels of the frequency environment previously allocated for at least a second of the number and band of the frequency channels of the frequency environment.

27. The apparatus of claim 16, wherein the scan channel allocation unit allocates the at least one of the number and band of the frequency channels of the frequency environment to the frequency set by determining a start channel and an end channel of the frequency channels that are to be scanned by the plurality of peripheral devices.

28. The apparatus of claim 16, wherein the information on the frequency channel state scanned includes at least information on communication quality of the frequency channels included in the frequency sets and information on whether the frequency channels included in the frequency sets are in use.

29. The apparatus of claim 16, wherein the idle channel scanning apparatus and the plurality of peripheral devices are wirelessly connected to each other.

30. An apparatus for scanning a frequency environment for an idle channel from among frequency channels via a base station communicating with a plurality of terminals in the same frequency environment, the apparatus comprising:

a scan channel allocation unit which allocates a plurality of frequency sets, each frequency set including at least one frequency channel of the frequency channels, to be scanned, in the frequency environment which is different from the frequency channels included in the other frequency sets of the plurality of frequency sets, to a plurality of terminals;

a request transmission unit which requests the plurality of terminals to scan states of frequency channels allocated to the plurality of frequency sets; and a reception unit which receives information on the states scanned by the plurality of terminals in response to the requesting, wherein frequency channels in a first set of the plurality of frequency sets and frequency channels in a second set of the plurality of frequency sets are simultaneously scanned by a first peripheral device of the plurality of peripheral devices, to which the first set is allocated, and a second peripheral device of the plurality of peripheral devices, to which the second set is allocated, respectively.

31. A non-transitory computer readable recording medium having recorded thereon a program for executing the method of claim 1.

* * * * *